(12) United States Patent
Allen et al.

(10) Patent No.: US 6,528,579 B2
(45) Date of Patent: Mar. 4, 2003

(54) ZERO-HEEL POLYESTER PROCESS

(75) Inventors: Kevin Dale Allen, Katy, TX (US); Emery Don Johnson, Houston, TX (US); Cecilia Zuqi Tse, Katy, TX (US); Samuel Martin Moats, Canal Fulton, OH (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/778,695

(22) Filed: Feb. 6, 2001

(65) Prior Publication Data

US 2002/0010310 A1 Jan. 24, 2002

Related U.S. Application Data

(60) Provisional application No. 60/183,179, filed on Feb. 17, 2000.

(51) Int. Cl.$^7$ .................. C08K 5/103; C08G 63/82
(52) U.S. Cl. .................. 524/777; 528/279; 528/280; 528/281; 528/283; 528/284; 528/285; 528/286; 528/503; 524/706; 524/710; 524/780; 524/783; 524/785
(58) Field of Search .................. 528/279, 280, 528/281, 283, 284, 285, 286, 503; 524/706, 777, 710, 780, 783, 785

(56) References Cited

U.S. PATENT DOCUMENTS

| | | |
|---|---|---|
| 2,465,319 A | 3/1949 | Whinfield et al. |
| 3,050,533 A | 8/1962 | Munro et al. |
| 3,427,287 A | 2/1969 | Pengilly .................. 260/75 |
| 3,442,868 A | 5/1969 | Ogata et al. .................. 260/75 |
| 3,749,697 A | 7/1973 | Barkey |
| 3,849,379 A | 11/1974 | Jeurissen et al. .................. 260/75 |
| 4,020,049 A | 4/1977 | Rinehart .................. 260/75 |
| 4,223,124 A | 9/1980 | Broughton et al. .................. 528/272 |
| 5,340,909 A | 8/1994 | Doerr et al. .................. 528/276 |
| 5,459,229 A | 10/1995 | Kelsey et al. .................. 528/275 |
| 5,872,204 A | 2/1999 | Kuo et al. |

FOREIGN PATENT DOCUMENTS

| | | |
|---|---|---|
| EP | 0547533 A1 | 6/1993 |
| GB | 776282 | 6/1957 |
| WO | 99/11709 | 3/1999 |
| WO | 01/14450 A1 | 3/2001 |

OTHER PUBLICATIONS

Patent Abstract of Japan, vol. 1999, No. 03, Mar. 31, 1999 and JP 10/324740 A (Tonen Chem Corp) Dec. 8, 1998 Abstract, May 30, 2001.
International Search Report of May 30, 2001.

Primary Examiner—Samuel A. Acquah
(74) Attorney, Agent, or Firm—Donald F. Haas

(57) ABSTRACT

The invention relates to a process for the preparation of polyesters of a glycol and a dicarboxylic acid which comprises the following steps:
a) introducing a feedstock comprising one or more glycols and one or more dicarboxylic acids or monoalcohol esters thereof into a reactor vessel,
b) heating the feedstock to an elevated temperature to cause the glycols and the acids or monoalcohol esters thereof to polycondense into a polyester,
c) removing all of the polyester from the reactor vessel,
wherein step b) is carried out in the absence of a preformed polyester ("zero heel" process). A condensation catalyst is added in step a) or b) or both.

28 Claims, No Drawings

ZERO-HEEL POLYESTER PROCESS

This application claims the benefit of U.S. Provisional Application No. 60/183,179, filed Feb. 17, 2000, the entire disclosure of which is hereby incorporated by reference.

FIELD OF THE INVENTION

The invention relates to a process for the preparation of polyesters of a glycol and a dicarboxylic acid which comprises the following steps:
a) introducing a feedstock comprising one or more glycols and one or more dicarboxylic acids or monoalcohol esters thereof into a reactor vessel,
b) heating the feedstock to an elevated temperature to cause the glycols and the acids or monoalcohol esters thereof to polycondense into a polyester,
c) removing all of the polyester from the reactor vessel, wherein step b) is carried out in the absence of a preformed polyester ("zero heel" process).

BACKGROUND OF THE INVENTION

Polyesters of commercial importance include poly(ethylene terephthalate) ('PET'), poly(butylene terephthalate) ('PBT'), poly(trimethylene terephthalate) ('PTT') and poly(ethylene naphthalate) ('PEN'). Currently, these and similar polyesters are prepared in batch and (semi-) continuous processes designed around a "heel" concept. The overall condensation polymerization reaction is comprised of an esterification step and a polycondensation step. In a process based on the heel concept, a portion of the esterification reaction product (that is liquid at the reaction temperatures) is left behind in the esterification reactor (the heel) while the balance is sent forward to polycondensation. The heel then acts as a solvent for the feedstock and also affords somewhat mass-averaged product quality, thus allowing uniform production.

Pengilly in U.S. Pat. No. 3,427,287 describes a method for preparing polyester resins comprising the continuous addition of terephthalic acid ('TPA') and monoethylene glycol ('MEG') in a molar ratio of 1:1.05 to 1:1.3 to a low molecular weight PET polyester having a degree of polymerization of from 3 to 20 while heating at a temperature above the melting temperature of the low MW polyester but below the distillation temperature of the glycol from said mixture to form a low MW polyester having a degree of polymerization of from 3 to 20 and continuously withdrawing an amount of the low MW polyester formed about equal to the amount of TPA and MEG added. A suitable polymerization apparatus is shown in a drawing, comprising a heated reaction vessel 1 that is filed about one-third full with low MW PET to which TPA is added from storage vessel 5 by means of a screw conveyor 6 through conduit 7, and to which MEG is added from storage vessel 8 by means of control valve 9 through conduit 10 (numbers refer to the drawing in U.S. Pat. No. 3,427,287).

Rhinehart in U.S. Pat. No. 4,020,049 describes a nearly identical method, wherein a low MW polyester is produced having a degree of polymerization of from 1.4 to 10, at a pressure of from 20 to 1000 psig.

Another example of a process based on the heel concept may be found in U.S. Pat. No. 4,223,124 to Broughton et al. In this process a dicarboxylic acid is added to a heel solution, whereupon an esterification reaction is conducted by adding an initially deficient amount of glycol.

Problems that have in the past been associated (by those skilled in the art) with zero-heel processes concern the agglomeration of acid in the glycol due to low solubility, lack of uniform product, slow polymerization rates and the (increased) production of color body precursors and other impurities. Particularly undesired products are the polyether dimer and oligomers of the one or more glycol used in the preparation of the polyester. If, for instance, the glycol component is composed of or comprises 1,3-propanediol, then the resulting polyester suffers from increased amounts of dipropylene glycol which can reactively cleave to form acrolein. It is therefore common to avoid direct contact of the acid and glycol components (see also U.S. Pat. No. 3,442,868 and U.S. Pat. No. 3,849,379. Zero-heel processes are hence not popular.

Surprisingly a zero-heel process in respect of the preparation of polyesters has now been developed that does not suffer from the disadvantages mentioned above. We have found that a zero-heel process which has sufficient solubility of, for instance, terephthalic acid in 1,3-propanediol and produces polymer, for instance, polytrimethylene terephthalate, is possible. The preferred process increases the total through-put of the production facility via utilizing reactor space normally taken up by the heel and decreases the amount of dipropylene glycol produced (when the glycol is 1,3-propanediol). It has therefore a substantial impact of the economic feasibility of the polyester preparation.

SUMMARY OF THE INVENTION

Accordingly, there is provided a process for the preparation of polyesters of a glycol and a dicarboxylic acid which comprises the following steps:
a) introducing feedstock comprising one or more glycols and one or more dicarboxylic acids or monoalcohol esters thereof into a reactor vessel,
b) heating the feedstock to an elevated temperature to cause the glycols and the acids or monoalcohol esters thereof to polycondense into a polyester,
c) removing all of the polyester from the reactor vessel, wherein step b) is carried out in the absence of a preformed polyester ("zero heel" process). It is highly preferred that one or more additives be added to the reaction vessel in step a) and/or b), wherein the additives comprise metal salts of strong or weak organic or inorganic bases. At least one catalyst which may be selected from condensation catalysts based on antimony, iron, titanium, zirconium, zinc, cobalt, lead, manganese, and niobium is added in step a) or b) or both.

DETAILED DESCRIPTION OF THE INVENTION

The zero-heel process can greatly simplify and reduce the cost of processing equipment. In a heel process, typically roughly 40%-60% of the esterified material is required to mix with incoming feed, while the balance moves forward to another reaction vessel for the polycondensation to occur. Therefore in a heel process two reactors are required. In contrast, the process described in this specification does not require the heel of material to start the reaction sequence, and hence allows the use of a single reactor (e.g., in a batch mode) for both processing steps, or in the case of a dual reactor design affords greater throughput per unit of reactor volume.

Albeit not essential, it is highly preferred in the zero-heel process of the present invention that the feed is intimately mixed, prior to the introduction thereof into the reactor vessel, e.g., in the form of a paste.

The ability to effectively react (or esterify) TPA with PDO without the use of a heel to produce oligomeric material effectively reduces the amount of time the polyester (polymer or oligomer) is subjected to thermal stress. The zero-heel process thus effectively reduces the risk of degradation reactions that lead to color body precursors. In the past, the heel process was thought to be the only possible way to achieve sufficient diacid solubility enabling effective reaction and acceptable polymer color.

The polyesters that may be made in accordance with the process of the present invention include such polyesters formed from dicarboxylic acids containing a total of from 2 to 16 carbon atoms, reacted with a glycol containing from 2 to 12 carbon atoms. The process of the present invention may also be used with monoalcohol diesters of said dicarboxylic acids, wherein the monoalcohol contains from 1 to 8 carbon atoms, such as methanol, ethanol, cyclohexanol, etc. However, the present invention is particularly suitable for the preparation of polyesters formed from dicarboxylic acids.

The dicarboxylic acids may be an alkyl-type containing a total of from 2 to 16 carbon atoms. Preferably, the acids are aryl or an alkyl substituted aryl-type containing from 8 to 16 carbon atoms. Specific examples of linear or alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic acid (terephthalic acid) or isophthalic acid; various isomers of naphthalene dicarboxylic acid, such as 1,8-naphthalene dicarboxylic acid (naphthalic acid), and p,p'-diphenyl dicarboxylic acid and the like. Specific examples of alkyl substituted aryl acids include the various isomers of dimethylphthalic acid such as dimethylterephthalic acid, the various isomers of diethylphthalic acid such as diethylisophthalic acid, diethylorthophthalic acid, diethylterephthalic acid, the various isomers of dimethylnaphthalic acid such as 2,6-dimethylnaphthalic acid and 2,5-dimethylnaphthalic acid, and the various isomers of diethylnaphthalic acid. Generally, isophthalic acid, naphthalic acid and/or terephthalic acid are preferred with terephthalic acid optionally in admixture with another acid being highly preferred.

The glycols may be straight-chain, cyclic or branched. Specific examples include 1,2-ethanediol (MEG), 1,2-propanediol, 1,3-propanediol ('trimethylene glycol' or 'PDO'), 1,2-butanediol, 1,3-butanediol, 1,4-butanediol, 2,3-butanediol, neopentyl glycol, dimethylolcyclohexane and the like. Of the various glycols, those having from 2 to 8 carbon atoms are preferred, with MEG and PDO being highly preferred.

The preferred acid is terephthalic acid. The preferred glycol is PDO. Thus, the preferred polymer is polytrimethylene terephthalate (PTT).

Generally, the molar ratio of the total amount of glycol added to the dicarboxylic acid ranges from about 1.0 to about 1.5, preferably from about 1.1 to about 1.4, more preferably from about 1.15 to about 1.25, and optimally about 1.20.

Use of 'difunctional' glycols and dicarboxylic acids will result in linear polyester polymers. However, the feedstock may also comprise minor amounts of monofunctional or polyfunctional monomers (terminators and crosslinking agents respectively), say up to an amount of about 10 mole %(based on the monomer it replaces), and/or heterofunctional monomers (e.g., hydroxy substituted carboxylic acids), say up to an amount of about 10 mole % (based on the total feedstock). The molar ratio of monomers, in such cases, need to be adapted to about equimolarity (about the same amount of hydroxy groups versus carboxyl groups). The preferred embodiment of the present invention is, however, to produce linear polyesters.

The esterification reaction proceeds preferably in an inert atmosphere such as nitrogen, helium, argon, carbon dioxide, nitrogen being preferred. Generally, the reaction is carried out at pressures within the reaction vessel or container from atmospheric (101 kPa absolute) to about 800 kPa (a). Desirably, the pressure ranges from about 275 kPa (a) to about 650 kPa (a) and preferably from about 300 kPa (a) to about 625 kPa (a).

Moreover, the reaction vessel is heated to a temperature generally near and preferably just below the boiling point, at the elevated reaction pressure, of the particular glycol utilized. Thus, in case of the esterification of the preferred feedstock, the reaction vessel and the contents therein are heated to a desirable temperature in the range of from about 180° C. to about 310° C., preferably from about 240 to about 290° C., more preferably from about 260° C. to about 280° C.

Generally, the temperature of the vessel for any particular glycol (having a lower atmospheric boiling point then the dicarboxylic acid) usually ranges from about 20° C. below the boiling point to about 100° C. above the boiling point, desirably from the boiling point to about 90° C. above it, and preferably from about 20° C. above to about 80° C. above the boiling point.

Preferably, the reactor vessel is fitted with a condenser to recapture the glycol and allow water or the alcohol released from the dicarboyxlic ester to escape as the esterification reaction takes place.

Once the esterification step has been carried out, a condensation step is initiated (in either the same vessel or in a separate polycondensation vessel) and carried out according to any conventional manner. This generally entails applying a vacuum of about 0.7 kPa (a) or less, preferably less than about 0.2 kPa (a), and optimally less than about 0.05 kPa (a). The temperature range of the condensation reaction is generally from about 180° C. to about 310° C., preferably from about 240 to about 290° C., more preferably from about 260° C. to about 280° C. At the end of the polycondensation reaction, pressure is raised to about 170 to 300 kPa (a), whereupon the polyester may be de-inventoried from the vessel.

Preferably, upon production of a stoichiometric amount of water or alcohol that is released from the dicarboxylic ester, the reactor vessel and contents thereof are subjected to reduced pressure to allow the polyester to gain molecular weight via the polycondensation reaction, while the one or more glycols are produced and captured via condensation in a vacuum trap.

The mere use of zero heel provides advantages as will be apparent from the examples. Preferably, however, the zero-heel process of the present invention is used in combination with certain additives as defined hereinafter, and/or in combination with certain catalysts as defined hereinafter.

The additives referred to above are anhydrous compounds having a pKb of at most 12.8 (Kb=8.3×10$^{-13}$), preferably at most 9.2 (Kb=5.9×10$^{-10}$) (determined at 25° C. in water). They can be added to the reaction vessel in step a) and/or b), but preferably in step a) of the process. Suitable examples of such additives include metal salts of strong or weak, organic or inorganic bases, for instance, sodium hydroxide, lithium hydroxide, sodium acetate, lithium acetate, or cobalt acetate. They are preferably used as pure compounds (anhydrous or hydrated; >95% pure).

The aforementioned use of additives significantly reduces the side products of zero-heel produced polyesters, without decreasing the process throughput. In particular in the production of PTT, the aforementioned lithium and sodium salts reduce the formation of dipropylene glycol (DPG) and hence of acrolein that forms upon the thermal cracking of DPG. Acrolein is a known carcinogen and is linked to the color formation in PTT. The effectiveness of these additives is also surprising in that the esterification reaction and polycondensation reaction is acid catalyzed and would be expected to be adversely affected by the presence of these additives.

The additives may be used in an amount of about 2 to about 60 ppmw based on total weight of the one or more dicarboxylic acids or ester thereof, preferably in an amount of about 10 to about 30 ppmw. Although the additives do produce some advantage in reducing the amount of DPG when they are added only in the polycondensation step, it is highly preferred that they be added in the esterification step since it is believed that the production of DPG is highest during the esterification reaction.

Use of esterification and/or polycondensation catalysts in the preparation of polyesters, as part of the zero-heel process, has the surprising effect of reducing the formation of polyether glycols as well. Accordingly, it is preferred to use a catalyst in either of steps a) or b) or in both of said steps of the present invention.

In prior art practice with the heel-type process, the catalyst used in the polymerization is almost always added in the polycondensation step. For practical purposes due to the fact that polycondensation is generally carried out under a vacuum, the catalyst is actually added in the esterification reactor after the completion of the esterification reaction.

In the present invention, the use of a catalyst is required. It may be added only in the polycondensation step. However, it is highly preferred that the catalyst instead be added during the esterification reaction. In such case, it will be added along with the reactants to the reaction vessel. If desired, the catalyst may be added during both the esterification and polycondensation steps.

The catalysts can be compounds of antimony, iron, titanium, zirconium, zinc, cobalt, lead, manganese, niobium, and the like, as well known to those skilled in the art, especially including alkoxides and derivatives thereof. Preferred catalysts are titanium and zirconium compounds, including titanium alkoxides and derivatives thereof, such as tetra(2-ethylhexyl)titanate, tetrastearyl titanate, diisopropoxy-bis(acetylacetonato) titanium, di-n-butoxy-bis(triethanolaminoato)titanium, tributyl monoacetyltitanate triisopropyl monoacetyltitanate and tetrabenzoic acid titanate; titanium complex salts such as alkali titanium oxalates and malonates, potassium hexafluorotitanate; and titanium complexes with hydroxycarboxylic acids such as tataric acid, citric acid or lactic acid, catalyst such as titanium dioxide/silicon dioxide coprecipitate and hydrated alkaline-containing titanium dioxide; and the corresponding zirconium compounds. For instance, good results have been found with titanium tetralkylates, such as titanium tetrabutanate. The amount of catalysts is also conventional and varies depending upon whether an active catalyst is utilized such as titanium, wherein only about 5 to about 50 parts of catalysts per million parts of esterified product is required, or a catalyst with a slower reaction rate such as antimony wherein approximately 200 parts per million of esterified products may be utilized.

In one embodiment of the invention, the zero-heel process is run without an additive and the catalyst is added only during polycondensation. A polymer with good color may be produced but the amount of DPG is relatively high and throughput (as measured by the reaction time in the esterification step because this is the time-critical step) is not increased significantly. In another embodiment, the additive is added in the esterification step and the catalyst is added in the polycondensation step. This results in lower DPG content but again, the reaction time is not significantly decreased. In another embodiment, the process may be run without an additive but the catalyst will be added during the esterification step. This results in both a faster reaction time and a lower production of DPG. Finally, in the preferred embodiment, both the catalyst and the additive are added during the esterification step. This results in a faster reaction time and an even lower DPG production than for the previous embodiment.

The preferred embodiment of the present invention comprises a zero-heel process wherein both an additive and a catalyst are used. Most preferably, both are added in the esterification step. This embodiment elegantly combines increased through-put with improved product quality.

Having generally described the invention, a more detailed understanding may be had from the following examples.

Examples have been carried out in a single vessel, lab reactor (2.5 l) equipped with an overhead vapor condensate vessel or in a similar larger 2 stage pilot reactor comprising a esterification vessel and a polycondensation vessel (36 l) or in a considerably larger pilot reactor.

The following chemicals have been used:
PDO 1,3-propanediol, ex Shell
TPA 1,4-terephthalic acid, ex Amoco
NaOAc sodium acetate, 99+% pure
LiOH lithium hydroxide monohydrate, 99+% pure
CoAc cobalt acetate tetrahydrate, 99+% pure
Ti(OBu)$_4$titanium tetrabutanate, 99+% pure, ex Alpha Aesar
I 1076 "IRGANOX® 1076", stabilizer, ex Ciba-Geigy
DPG Dipropylene glycol (in situ-formed)
TiO$_2$ titanium dioxide added as a delustering agent in Example 5

EXAMPLE A

In the esterification step, PDO (315 g; 4.14 moles) and TPA (549 g; 3.30 moles) were intimately mixed in the lab reactor at ambient temperature to form a paste. The lab reactor was purged with nitrogen, pressured to 375 kPa (a). The paste was heated to 258° C. (at which time water vapor was produced indicating that the reaction had begun) and allowed to react for 178 minutes while a near stoichiometric amount of water was collected in the overhead vapor condensate vessel.

To this oligomer 40 ppm (Ti) was added with stirring, for process convenience, at the end of the esterification. Pressure was gradually reduced to 0.4 kPa (a). After 80 minutes, the polycondensation reaction was completed at 258° C. The polymer was then de-inventoried from the reaction vessel and analyzed.

The experimental data and analytical data are collected in the Table.

EXAMPLES 1- 5, C, AND COMPARATIVE EXAMPLE B

In a manner similar to Example A, three experiments were conducted in the smaller lab reactor (Examples 1 to 3), and four experiments were conducted in the larger pilot scale reactors (B, C, and 4 in the 36 liter reactor, and 5 in the larger reactor).

In Example 1, lithium hydroxide was added as the additive in the esterification step and the catalyst was added during the polycondensation step. In Example 2, catalyst was added during the esterification step and no additive was used. A second, and probably unnecessary, charge of catalyst was added during polycondensation. In Example 3, both the lithium hydroxide additive and the catalyst were added during the esterification step.

In Comparative Example B, PDO and TPA were separately introduced into the reactor and in Examples C, 4, and 5, a paste was made before introduction to the esterification vessel. Besides, in Comparative Example B and Examples C, 4, and 5, the esterified material was removed from the esterification vessel and transferred to a polycondensation reaction vessel. The catalyst was added only at the end of esterification. Comparative Example B used a heel.

The experimental data and analytical data of these examples are also collected in the Table.

Example 1 illustrates that the addition of the lithium hydroxide additive during esterification can result in the production of a lower DPG content polymer (as compared to the polymer produced in Example A) but there is no significant increase in rate as measured by the esterification reaction time (as compared to Example A). Example 2 illustrates that addition of catalyst during the esterification reaction can both reduce the reaction time in esterification and produce a lower DPG content polymer (as compared to Example A). Example 3 illustrates that the addition of both the lithium hydroxide additive and the catalyst during esterification results in a decrease in reaction time and an even lower DPG content polymer.

TABLE

| Example | A | 1 | 2 | 3 | B | C | 4 | 5 |
|---|---|---|---|---|---|---|---|---|
| Feed | | | | | | | | |
| heel (g) | — | — | — | — | 5500 | — | — | — |
| PDO (g) | 315 | 315 | 315 | 315 | 4185 | 6278 | 6278 | 27200 |
| TPA (g) | 549 | 549 | 549 | 549 | 7310 | 10963 | 10963 | 47510 |
| mole ratio | 1.25 | 1.25 | 1.25 | 1.25 | 1.25 | 1.25 | 1.25 | 1.25 |
| NaOAc (mmole)[2] | — | — | — | — | — | — | 2.88 | |
| CoAc (mmole)[2] | | | | | | | | 8.05 |
| LiOH (mmole)[2] | — | 0.69 | — | 0.21 | — | — | — | |
| Esterification | | | | | | | | |
| Ti added (ppm) | — | — | 40 | 40 | — | — | — | 40 |
| Temp. (° C.) | 258 | 258 | 258 | 258 | 260 | 260 | 259 | 260 |
| t[1] (min.) | 178 | 180 | 143 | 145 | 164 | 250 | 260 | 160 |
| polycondensation | | | | | | | | |
| Ti added (ppm) | 40 | 40 | 40 | — | 40 | 40 | 40 | — |
| I 1076 (ppm) | — | — | — | — | 250 | 250 | 250 | 250 |
| Temp. (° C.) | 258 | 258 | 258 | 258 | 253 | 253 | 253 | 250 |
| p (kPa) | 0.4 | 0.4 | 0.1 | 0.1 | 0.04 | 0.04 | 0.04 | 0.5 |
| t (min.) | 80 | 120 | 120 | 120 | 139 | 139 | 140 | 120 |
| PTT analysis | | | | | | | | |
| DPG (% wt) | 3.1 | 1.3 | 1.3 | 0.8 | 1.9 | 3.1 | 1.6 | 1.2 |
| m.p. (° C.) | | | | | 227.5 | 223.6 | 227.7 | — |
| I.V. (dl/g) | 0.551 | 0.650 | 0.644 | 0.561 | 0.671 | 0.671 | 0.646 | 0.652 |
| b* | | | | | 12.30 | 12.26 | 10.93 | 3.63 | m.p. melting point (using a TA Instruments 912 Differential Scanning Calorimeter at 10 ° C./min)
I.V. intrinsic viscosity (at 30 ° C. in 60/40 v/v phenol/tetrachloroethane, using a Schott-Gerate 538-20 viscometer)
b* yellowness index (CIELab (L*; a*; b*) color scale, using a Hunter LabScan II Spectrophotometer (Example 5 measured on a different Hunter LabScan II Spectrophotometer and also had 0.04% wt basis mass of polymer of delustering agent added).
[1]the esterification reaction time, t, begins after preheating when water vapor is first produced, indicating that the reaction has begun (except for the large scale runs, B, C, 4, and 5, wherein the initial production of water vapor was not monitored and t includes the preheating time).
[2]the ppmw of the additive is calculated by multiplying the number of millimoles of additive by its molecularweight and dividing by the number grams of TPA Conclusion Example A is a bench scale experiment based on a typical PTT recipe, however, without heel. It illustrates that, at least in part, the prejudice against zero-heel processes seems correct since the DPG content is quite high. Example C corresponds to Example A, now conducted in a larger pilot scale. Again the DPG content is quite high. However, since Example C had a slightly better color corresponding to what is found in the process using a heel (Comparative Example B), it can be seen that the zero-heel process can produce high quality polymer with good color and, as evidenced by complete esterification, there is no solubility problem with TPA in the zero-heel process.

Examples 4 and 5 are pilot scale experiments according to the invention, using additive. Both the DPG content and the yellowness index substantially improved.

We claim:
1. A process for the preparation of polyesters of a glycol and a dicarboxylic acid which comprises the following steps:
   a) introducing feedstock comprising one or more glycols and one or more dicarboxylic acids or monoalcohol esters thereof into a reactor vessel,
   b) heating the feedstock to an elevated temperature to cause the glycols and the acids or monoalcohol esters thereof to polycondense into a polyester,
   c) removing all of the polyester from the reactor vessel;
   wherein step b) is carried out in the absence of a preformed polyester ("zero heel" process); and wherein one or more additives are added to the reaction vessel in step a), wherein the additives are selected from the group consisting of Group I metal hydroxides; and wherein at least one catalyst is added in step a) or in both step a) and b), wherein the catalyst is selected from the group consisting of compounds of antimony, iron, titanium, zirconium, zinc, cobalt, lead, manganese, and niobium.

2. A process as claimed in claim 1 wherein at least one additive is added and the additive is a compound having a pKb of at most 12.8 (Kb=8.3×10$^{-13}$)(determined at 25° C. in water).

3. A process as claimed in claim 1 wherein the additive is used in an amount of 2 to 60 ppmw based on total weight of the one or more dicarboxylic acids or ester thereof.

4. A process as claimed in claim 1 wherein a condensation catalyst is used in an amount of up to 200 parts of catalyst per million parts of esterified product (ppm).

5. A process as claimed in claim 4 wherein the catalyst is a titanium tetraalkylate, used in an amount of 5 to 50 ppm.

6. A process as claimed in claim 5 wherein the catalyst is titanium tetrabutanate.

7. A process as claimed in claim 1 wherein the one or more glycols and the one or more dicarboxylic acids or esters thereof are premixed at a molar ratio of 1.0 to 1.5 mole of glycol to 1 mole acid.

8. A process as claimed in claim 1 wherein the feedstock comprises 1,3-propanediol and terephthalic acid.

9. A process as claimed in claim 1 wherein the feedstock is heated to a temperature in the range of 180 to 310° C. at a pressure in the range of 101 to 800 kPa.

10. A process as claimed in claim 1 wherein in the reactor vessel is fitted with a condenser to recapture the glycol and allow water or the alcohol released from the dicarboxylic ester to escape as the esterification reaction takes place.

11. A process as claimed in claim 10, wherein upon production of a stoichiometric amount of water or alcohol that is released from the dicarboxylic ester, the reactor vessel and contents thereof are subjected to reduced pressure to allow the polyester to gain molecular weight via the polycondensation reaction, while the one or more glycols are produced and captured via condensation in a vacuum trap.

12. A process as claimed in claim 1 wherein the additive is selected from the group consisting of sodium hydroxide and lithium hydroxide.

13. A process as claimed in claim 12 wherein the additive is used in an amount of 2 to 60 ppmw based on total weight of the one or more dicarboxylic acids or ester thereof.

14. A process as claimed in claim 1 wherein one or more additives are added in step a) and at least one catalyst is added in step a).

15. A process as claimed in claim 14 wherein the additive is selected from the group consisting of sodium hydroxide and lithium hydroxide.

16. A process as claimed in claim 14 wherein the additive is used in an amount of 2 to 60 ppmw based on total weight of the one or more dicarboxylic acids or ester thereof.

17. A process as claimed in claim 14 wherein a condensation catalyst is used in an amount of up to 200 parts of catalyst per million parts of esterified product (ppm).

18. A process as claimed in claim 17 wherein the catalyst is a titanium tetraalkylate, used in an amount of 5 to 50 ppm.

19. A process as claimed in claim 18 wherein the catalyst is titanium tetrabutanate.

20. A process as claimed in claim 14 wherein at least one additive is added and the additive is a compound having a pKb of at most 12.8 (Kb=8.3×10$^{-13}$)(determined at 25° C. in water).

21. A process as claimed in claim 14 wherein the feedstock comprises 1,3-propanediol and terephthalic acid.

22. A process for the preparation of polyesters of a glycol and a dicarboxylic acid which comprises the following steps:

a) introducing feedstock comprising one or more glycols and one or more dicarboxylic acids or monoalcohol esters thereof into a reactor vessel, b) heating the feedstock to an elevated temperature to cause the glycols and the acids or monoalcohol esters thereof to polycondense into a polyester, c) removing all of the polyester from the reactor vessel;

wherein step b) is carried out in the absence of a preformed polyester ("zero heel" process); and wherein one or more additives are added to the reaction vessel in step a), wherein the additives are selected from the group consisting of Group I metal hydroxides; and wherein at least one catalyst is added in step b), wherein the catalyst is selected from the group consisting of compounds of antimony, iron, titanium, zirconium, zinc, cobalt, lead, manganese, and niobium.

23. A process as claimed 22 wherein at least one additive is added and the additive is a compound having a pKb of at most 12.8 (Kb=8.3×10$^{-13}$)(determined at 25° C. in water).

24. A process as claimed in claim 22 wherein the additive is selected from the group consisting of sodium hydroxide and lithium hydroxide.

25. A process as claimed in claim 22 wherein the additive is used in an amount of 2 to 60 ppmw based on total weight of the one or more dicarboxylic acids or ester thereof.

26. A process as claimed in claim 22 wherein a condensation catalyst is used in an amount of up to 200 parts of catalyst per million parts of esterified product (ppm).

27. A process as claimed in claim 22, wherein the catalyst is titanium tetraalkylate, used in an amount of 5 to 50 ppm.

28. A process as claimed in claim 27 wherein the catalyst is titanium tetrabutanate.

* * * * *